United States Patent [19]

Laughlin et al.

[11] Patent Number: 4,483,828
[45] Date of Patent: Nov. 20, 1984

[54] METHOD OF PRODUCING MANGANESE SULFATE SOLUTIONS OF IMPROVED PURITY

[75] Inventors: William C. Laughlin, Edmond; Virgil J. Barczak, Oklahoma City; Paul D. Bowerman, Edmond; Theodore A. Rado, Oklahoma City, all of Okla.

[73] Assignee: Kerr-McGee Chemical Corporation, Oklahoma City, Okla.

[21] Appl. No.: 577,995

[22] Filed: Feb. 8, 1984

[51] Int. Cl.$^3$ .............................................. C01G 45/10
[52] U.S. Cl. ........................................ 423/49; 423/52; 423/605
[58] Field of Search ...................... 423/49, 52; 75/121

[56] References Cited

U.S. PATENT DOCUMENTS

| 1,279,110 | 9/1918 | Haslup | 423/52 |
| 3,227,520 | 1/1966 | Samonides | 423/52 |
| 3,667,906 | 6/1972 | Sasaki | 23/145 |
| 3,864,118 | 2/1975 | Schumacher et al. | 423/49 |
| 4,285,913 | 8/1981 | Soni et al. | 423/50 |

FOREIGN PATENT DOCUMENTS 393341  12/1973  U.S.S.R. ............................... 75/121

Primary Examiner—Herbert T. Carter
Attorney, Agent, or Firm—William G. Addison; John P. Ward

[57] ABSTRACT

A process for the preparation of manganese sulfate solutions having reduced levels of potassium impurity comprising blending a reduced manganese ore, an added source of water soluble aluminum ions and an aqueous acid solution to form a digestion mixture, digesting said mixture, preferably in the presence of crystals of a complex potassium-aluminum salt to form a mixed reaction product containing a liquid phase of manganese sulfate solution and recovering the liquid phase of manganese sulfate solution from said mixed reaction product.

10 Claims, No Drawings

METHOD OF PRODUCING MANGANESE SULFATE SOLUTIONS OF IMPROVED PURITY

FIELD OF THE INVENTION

Cross Reference to Related Applications

Aspects of the present invention are related to subject matter disclosed in co-pending applications entitled "Improvements in the Manufacture of Manganese Sulfate Solutions": Ser. No. 577,996 and "Process of Producing Manganese Sulfate Solutions": Ser. No. 577,997, both co-pending applications filed on an even date herewith and both assigned to the same assignee as the present invention.

The present invention relates to the preparation of manganese sulfate solutions for use in the manufacture of electrolytic manganese dioxide. More particularly, the invention relates to the preparation of manganese sulfate solutions containing low levels of potassium as an impurity.

BACKGROUND OF THE INVENTION

It is known that manganese dioxide of a grade suitable for use as a depolarizer in dry cell batteries can be manufactured synthetically from precursor manganese sulfate solutions by the oxidation, either electrolytically or by use of an oxidizing agent, of the manganese ion in said solutions to manganese dioxide. Also, it is known that the precursor manganese sulfate solutions can be prepared by the reduction and digestion of naturally occuring manganese ores such as those of the pyrolusite/cryptomelane type. However, a drawback to the use of such manganese ores of the cryptomelane type is the presence therein of high levels of potassium.

The presence of potassium impurity in electrolytic manganese dioxide adversely affects the latter's capability to function satisfactorily as a depolarizer in dry cell batteries. As a result, numerous solutions have been proposed for removing potassium impurity from electrolytic manganese dioxide. The majority of these proposed solutions relate to the removal of potassium impurity during the preparation of the precursor manganese sulfate solution. For example, in U.S. Pat. No. 3,667,906 there is disclosed a method of removing potassium impurity from naturally occurring manganese ores used in the preparation of the manganese sulfate electrolyte comprising washing a reduced or calcined manganese ore with hot water to remove soluble potassium prior to subjecting said reduced or calcined manganese ore to subsequent acid leaching and separation steps.

U.S. Pat. No. 4,285,913 discloses another method for producing manganese sulfate electrolyte solutions containing reduced levels of potassium. In this patent, there is described a process wherein reduced or calcined manganese ore containing potassium impurity is leached with a liquor comprising spent electrolyte (i.e., an aqueous solution containing sulfuric acid and manganese ion) to which has been added a source of iron to provide soluble ferric ions. The leaching process is carried out under specific conditions of pH, time and temperature as to yield a mixture of digested ore and manganese sulfate solution which solution is stated to have reduced levels of potassium impurity. Further, it is stated that subsequent treatment of the mixture with additional reduced or calcined ore to raise the pH of the mixture and to precipitate the remaining iron followed by a liquid/solid separation step thus provides an electrolyte highly suited to the preparation of electrolytic manganese dioxide.

While processes, such as those discussed above, may be effective in reducing the levels of potassium impurity in precursor manganese sulfate solutions, there still remains a need for other, more effective and efficient, processes from an operational and cost standpoint. The present invention provides for such a process.

SUMMARY OF THE INVENTION

As described in greater detail hereinafter, the present invention relates to a process which may be operated continuously or batchwise for the production of manganese sulfate solutions containing low levels of potassium as an impurity. In general, the process of the invention comprises the features of (A) blending a reduced manganese ore containing potassium impurity, an added source of water soluble aluminum ion and an aqueous acid solution selected from the group consisting of an aqueous sulfuric acid and spent electrolytic cell electrolyte containing sulfuric acid to form a digestion mixture having a solution pH of at least about 4.0, (B) digesting said mixture at temperature sufficient to leach manganese ions from said ore and form a mixed reaction product containing a liquid phase of manganese sulfate solution and a solid phase of a mixture of digested ore residue and a particulate complex potassium-aluminum salt byproduct and (C) recovering said manganese sulfate solution from said mixed reaction product.

A further embodiment of the present invention comprises contacting said mixture of reduced ore, aqueous acid solution and added soluble aluminum ions, during the digestion thereof, with a complex potassium-aluminum salt and preferably the particulate complex potassium-aluminum salt byproduct produced and recovered from a previous digestion of such a mixture. Thus, this invention includes, as a further embodiment, the recycle of at least a portion of the complex potassium-aluminum salt byproduct produced during an earlier digestion of a mixture, such as defined above, back to a digestion zone where it is contacted with a fresh mixture of reduced ore, aqueous acid solution and added water soluble aluminum ions. The recycle of at least a portion of the complex salt byproduct, either alone of in admixture with digested ore residue, back to a digestion zone wherein it is contracted with a fresh mixture of reduced ore, aqueous acid solution and added water soluble aluminum ion provides an accelerated rate of reaction between the potassium impurity and aluminum ions in said mixture resulting in a greater degree of removal of said impurity from the manganese sulfate cell feed solution being formed.

DETAILED DESCRIPTION OF THE INVENTION

As noted hereinabove, the present invention comprises a novel process for the preparation of manganese sulfate cell solutions useful in the manufacture of electrolytic manganese dioxide. Through the use of the present invention, manganese sulfate cell feed solutions can be prepared which are characterized by substantially reduced levels of potassium as an impurity.

In accordance with the practice of the present invention, a mixture of a reduced manganese ore containing potassium impurity, an aqueous sulfuric acid solution or spent electrolytic cell electrolyte containing sulfuric acid and a source of added water soluble aluminum ions first is prepared by the blending of the above constituents in appropriate proportions. The manganese ore employed in the practice of this invention may be any one of a number of naturally occurring ores available which contain potassium as an impurity. The ore employed in this invention will be, in a reduced state, i.e., all or substantially all of the manganese (IV) ions in the ore will have been reduced to manganese (II) ions. Procedures for reducing manganese ores are well known and do not form a part of the present invention. An example of a procedure for reducing manganese ores can be found in U.S. Pat. No. 3,667,906 and include the heating of such ores at elevated temperatures (e.g., 400° C. to 1200° C.) in the presence of reducing agents.

Following reduction of the ore, to convert all or substantially all of the manganese (IV) ions in said ore to manganese (II) ions, the ore generally will be comminuted to increase its effective surface area and thereby improve its susceptibility to subsequent digestion with acid solution. One known method employed for the comminution of reduced manganese ores is ball milling wherein the ore is reduced to the desired size in a rotatable vessel containing a quantity of crushing means such as cast iron balls. A liquid medium such as water may be added to the vessel in order to aid comminution of the ore and to provide a slurry which is readily pumpable.

The aqueous sulfuric acid solution blended with the reduced ore may be either fresh acid solution or spent electrolyte (i.e., aqueous sulfuric acid solution containing manganese ion) from the electrolytic cells in which the electrolytic manganese dioxide is produced. In either event the free acid concentration in said solution will generally range from about 10 to about 50 grams per liter of such solution.

As noted hereinabove, the mixture prepared and employed in the present invention also will include added water soluble aluminum ions. The source of aluminum ions is not critical to the operation of the present invention, however, it is important that such source be capable of providing free aluminum ions in the mixture to give the minimum mole ratio of aluminum ion to potassium ion defined hereinbelow. Representative examples of sources of water soluble aluminum ion suitable in carrying out the process herein described include aluminum salts such as aluminum chloride, aluminum sulfate and the like and aluminum metal which previously has been dissolved in an acid such as hydrochloric acid, sulfuric acid and the like. The reduced ore itself also may be a source of water soluble aluminum ion. However, while some aluminum ion may be present in the ore, a source of aluminum ion other than just the ore itself is necessary to obtain the desired removal of all or substantially all of said potassium impurity.

Generally, water soluble aluminum ion will be added in amounts sufficient to provide a minimum mole ratio of aluminum ion to potassium ion of at least about 4:1. Higher ratios may be employed, with the rate of potassium removal increasing proportionally therewith. Usually an amount of an aluminum ion source sufficient to provide aluminum ion to potassium ion mole ratios ranging from about 4:1 to about 50:1 will be suitable in the practice of the present invention.

The reduced ore, aqueous sulfuric acid solution or spent cell electrolyte and water soluble aluminum ions will be blended together in such amounts as to provide a digestion mixture having a critical solution pH of at least about 4.0. Generally, however, the process of this invention can be carried out at a solution pH ranging from about 5.0 to about 7.0 with a solution pH of about 6.0 to about 6.5 being preferred. The actual amounts of reduced ore and acid solution to be blended together to provide mixtures having solution pH's corresponding to those specified above will depend upon the basicity and acidity of these materials, respectively.

Those of ordinary skill in the art knowing the basicity and acidity of these materials can determine the precise amounts of these materials that must be employed to produce a digestion mixture having the requisite solution pH's.

On completion of the blending of the reduced ore, aqueous sulfuric acid solution and aqueous aluminum ions to form a digestion mixture having a critical solution pH of at least about 4.0, said mixture is digested, in a suitable digestion zone, at temperatures sufficient to leach manganese (II) ions from said ore and form a solution containing manganese sulfate. Temperatures at which the mixture will be digested will range from about 70° C. to about 95° C. with temperatures ranging from about 80° C. to about 90° C. being preferred.

In addition to manganese (II) ions being leached from the ore to form the desired manganese sulfate solution, potassium ions also will be removed from the ore. However, under the temperature and pH conditions employed in the digestion zone it has been found that these potassium ions will react readily with the water soluble aluminum ions to form an insoluble particulate complex potassium-aluminum salt byproduct believed to have the formula $KAl_3(SO_4)_2(OH)_6$. Therefore, through the practice of this invention, potassium impurity effectively is removed in the form of the above complex salt byproduct leaving a manganese sulfate solution substantially free from potassium impurity.

Following digestion of the above described mixture and the formation of the mixed reaction product comprising a liquid phase of manganese sulfate solution and a solid phase of digested ore residue and insoluble particulate complex potasssium-aluminum salt byproduct these phases then are separated from one another in a separation zone. Generally, it is desirable to subject the separated manganese sulfate solution to further purification techniques such as treatment with hydrogen sulfide to remove heavy metal impurities such as cobalt, nickel and the like, prior to introduction of the solution into an electrolytic cell for use in the manufacture of electrolytic manganese dioxide.

As noted hereinabove, it also has been discovered that if the digestion of the mixture of reduced ore, aqueous acid solution and water soluble aluminum ions is carried out in the presence of a complex potassium-aluminum salt such as, for example, the particulate salt byproduct formed during the digestion of the above described mixture, the induction period associated with the reaction between the potassium impurity and the aluminum ion is reduced dramatically. This decrease in the induction period results in a faster and more complete removal of the potassium impurity. Therefore, in a preferred embodiment of the present invention, a portion of the particulate salt byproduct either alone or in admixture with digested ore residue will be recycled back to a digestion zone containing fresh digestion mixture to effect the reduction in the aforementioned induction period. The portion of the salt byproduct or admixture thereof that will be recycled back to the digestion zone will be an amount sufficient to provide a concentration of said salt byproduct in the aqueous acid solution of the digestion mixture of at least 10 grams per liter of said aqueous acid solution. Preferably, the amount should range from about 10 grams to about 80 grams of the salt byproduct per liter of said aqueous acid solution.

As noted hereinabove, through the practice of the process of this invention, the level of potassium impurity normally present in manganese sulfate solutions for use in the manufacture of electrolytic manganese dioxide can be substantially reduced. Thus, as a result of the use of this invention, manganese sulfate solutions containing as little as five parts by weight of potassium per million parts by weight of manganese sulfate can be prepared.

The following examples illustrate the invention described herein and are not intended to limit the scope and spirit of the invention. All parts and percentages, where used, are by weight unless noted to be otherwise.

EXAMPLES 1-7

A series of experiments was carried out to demonstrate the effectiveness of the use of water soluble aluminum ions alone and in combination with crystals of a complex potassium-aluminum salt to remove potassium impurity from a manganese leach liquor. The leach liquor employed in each experiment contained 40 grams per liter (g/l) of solution of manganese, as manganese (II) ion, 200 milligrams per liter (mg/l) of solution of potassium and 3.0 mg/l of solution of iron, as ferrous ion.

This leach liquor was divided into seven equal portions of approximately 300 milliliters each and added to an equal number of 500-milliliter round bottom flasks equipped with both stirring and heating means. To each portion of leach liquor in the flasks then was added sufficient aluminum sulfate to provide an aluminum ion concentration in said portion of 6.7 g/l of solution. The solution pH of the various leach liquor portions was then adjusted to range from 2.5 to 6.3. Also, to certain of the solutions was added 13 g/l of crystals of a potassium-aluminum salt byproduct previously prepared by heating a mixture of reduced manganese ore, aqueous sulfuric acid and water soluble aluminum ions. Table I below sets forth the operating conditions employed and results obtained in these experiments.

TABLE I

| Experiment No. | 1 | 2 | 3 | 4 | 5 | 6 | 7 |
|---|---|---|---|---|---|---|---|
| Temp., °C. | 90 | 50 | 50 | 90 | 90 | 90 | 50 |
| pH | 2.5 | 2.5 | 4.5 | 4.5 | 6.3 | 6.3 | 6.3 |
| Salt Byproduct | No | No | Yes | Yes | Yes | No | Yes |
| Time, hrs. | Potassium Ion Concentration, mg/l | | | | | | |
| 0.0 | 200 | 200 | 200 | 200 | 200 | 200 | 200 |
| 1.0 | 200 | 200 | 200 | 130 | 112 | 190 | 190 |
| 2.0 | 200 | 200 | 200 | 93 | 60 | 190 | 175 |
| 3.0 | 200 | 200 | 180 | 70 | 45 | 175 | 120 |

As shown by the data in Table I, the use of water soluble aluminum ions results in a reduction in potassium impurity of a manganese leach liquor only at solution pH's of at least 4.0 and greater. The data further demonstrate the increase in the rate and extent of potassium impurity removal with time when the leach liquor containing water soluble aluminum ions is heated while in contact with crystals of a potassium-aluminum salt.

EXAMPLES 8-12

A second series of experiments was carried out employing the same equipment and in a manner similar to that employed in Examples 1-7. However, the leach liquor prepared for use in the second series contained 36 g/l of manganese, as manganese (II) ion, 280 mg/l of potassium and 6 mg/l of iron, as ferrous ion. The solution pH of the leach liquor was 6.3. Crystals of the same potassium-aluminum salt byproduct, as employed in Examples 1-7, were employed in all experiments in this second series with the amount of such crystals varying from experiment to experiment. Aluminum sulfate in varying amounts was also added to each of the experimental solutions. Operating conditions for and results achieved in this second series of experiments is set forth in Table II below.

TABLE II

| Experiment No. | 8 | 9 | 10 | 11 | 12 |
|---|---|---|---|---|---|
| Temp., °C. | 70 | 90 | 90 | 90 | 90 |
| Salt Byproduct, g/l | 13 | 20 | 30 | 13 | 13 |
| Al Conc., g/l | 9.2 | 9.2 | 9.2 | 4.6 | 2.3 |
| Time, hrs. | Potassium Ion Concentration, mg/l | | | | |
| 0.0 | 280 | 280 | 280 | 280 | 280 |
| 1.0 | 230 | 164 | 140 | 200 | 240 |
| 2.0 | 200 | 98 | 61 | 138 | 215 |
| 3.0 | 175 | 47 | 4 | 81 | 190 |

As shown by the date in Table II, the operating conditions of temperature, crystal concentration and water soluble aluminum ion concentration can vary widely in the practice of the present invention. These data also demonstrate the effect that changes in these process conditions have on the rate and extent of removal of potassium impurity from the manganese leach liquor with time.

While the invention has been disclosed with respect to what at present are believed to be the preferred embodiments thereof, it is to be understood that this invention is not to be limited to these specific embodiments and that changes may be made in the process of the present invention without departing from the spirit and scope of the invention except as defined in the following claims.

What is claimed is:

1. A process for producing manganese sulfate solutions containing low levels of soluble potassium impurity from manganese ores containing potassium impurity, said solutions being suitable for use in the manufacture of electrolytic manganese dioxide comprising:

A. blending a reduced manganese ore, an added source of water soluble aluminum ions and an aqueous acid solution selected from the group consisting of aqueous sulfuric acid and spent aqueous electrolyte containing sulfuric acid to form a digestion mixture having a pH of at least about 4.0, B. digesting said mixture at temperatures sufficient to form a mixed reaction product comprising a liquid phase of manganese sulfate solution and a solid phase of an admixture of digested ore residue and a particulate complex potassium-aluminum salt byproduct, and C. recovering said liquid phase of manganese sulfate solution from said mixed reaction product.

2. The process of claim 1 wherein said mixture is digested while in contact with a complex potassium-aluminum salt.

3. The process of claim 2 wherein said complex potassium-aluminum salt is the particulate complex salt byproduct from the solid phase of the mixed reaction product resulting from the digestion of the mixture.

4. The process of claim 1 wherein the solid phase, containing digested ore residue and particulate complex potassium-aluminum salt byproduct, of the mixed reaction product is recovered and recycled back to and contacted with fresh digestion mixture during the digesting thereof.

5. The process of claim 1 wherein said particulate complex potassium-aluminum salt byproduct in the solid phase of the mixed reaction product is recovered from said solid phase and recycled back to and contacted with fresh digestion mixture during the digesting thereof.

6. The process of claim 1 wherein the pH of the mixture ranges from about 5.0 to about 7.0.

7. The process of claim 1 wherein said mixture is heated at a temperature ranging from about 70° C. to about 95° C.

8. The process of claim 1 wherein the source of water soluble aluminum ions is selected from the group consisting of aluminum metal and aluminum salts.

9. The process of claim 8 wherein the source of water soluble aluminum ions is an aluminum salt.

10. The process of claim 1 wherein the molar ratios of soluble aluminum ions to potassium impurity, as potassium ion, in said mixture ranges form about 4 to about 50.

* * * * *